United States Patent [19]

Collins et al.

[11] Patent Number: 4,652,613

[45] Date of Patent: Mar. 24, 1987

[54] NOVEL ELASTOMER/OXYMETHYLENE POLYMER BLENDS CONTAINING POLYMERIC COMPATIBILIZING AGENTS

[75] Inventors: George L. Collins, Maplewood; Paul Zema, Roselle Park, both of N.J.; Yusuf A. Rashada, Atlanta, Ga.

[73] Assignee: Celanese Corporation, New York, N.Y.

[21] Appl. No.: 808,969

[22] Filed: Dec. 16, 1985

[51] Int. Cl.$^4$ .......................... C08L 61/00; C08F 8/00
[52] U.S. Cl. ........................................ 525/69; 525/154
[58] Field of Search ............................ 525/154, 69, 86

[56] References Cited

U.S. PATENT DOCUMENTS

| 3,364,157 | 1/1968 | Halek et al. | 525/123 X |
| 3,392,118 | 7/1968 | Isaacson et al. | 525/154 X |
| 3,476,832 | 11/1969 | Pritchard | 525/127 X |
| 4,136,136 | 1/1979 | Dreyfuss et al. | 525/337 |

*Primary Examiner*—Theodore E. Pertilla
*Attorney, Agent, or Firm*—Thomas J. Morgan

[57] ABSTRACT

Novel elastomer/oxymethylene polymer blends are disclosed whose impact strength or resistance has been enhanced, with no appreciable diminution in their outer useful properties, by the inclusion therein of a novel elastomer/oxymethylene graft copolymer compatibilizing agent prepared by grafting polyformaldehyde or oxymethylene copolymer chains onto a halogenated elastomeric polymer by means of a reaction initiated at graft sites, i.e., at the sites of the haloelastomer's halo substituents, using, e.g., an initiated site-forming cationic salt.

20 Claims, No Drawings

NOVEL ELASTOMER/OXYMETHYLENE POLYMER BLENDS CONTAINING POLYMERIC COMPATIBILIZING AGENTS

BACKGROUND OF THE INVENTION

1. Field of the Invention

This invention relates to novel elastomer/oxymethylene polymer blends. This invention further relates to novel elastomer/oxymethylene polymer blends whose impact strength or resistance has been enhanced, with no appreciable diminution in their other useful properties, by the inclusion of a novel elastomer/oxymethylene graft copolymer compatibilizing agent, and relates as well to such compatibilizing agents and processes for their preparation. This invention also relates to molding resins and high performance shaped structures molded therefrom comprising these compatibilized elastomer/oxymethylene polymer blends.

2. Description of the Prior Art a. Elastomer/Oxymethylene Polymer Blends

Blends of oxymethylene polymers with rubbery polymeric materials are known in the art. For example, U.S. Pat. No. 3,476,832, issued Nov. 4, 1969 to Pritchard and assigned to Celanese Corporation, discloses improving the impact strength and flex resistance of oxymethylene polymers containing at least 60 percent repeating oxymethylene groups by blending them with rubbery polymers, particularly ones having a hydrocarbon backbone and pendant nitrile groups, such as diolefin/acrylonitrile copolymers.

Coupling oxymethylene homo-, co- and terpolymers to other polymers having active hydrogen substituents, such as hydroxyl, amino, amido, carboxyl, mercapto and thiocarbonyl groups, using diisocyanates as the coupling agents, is disclosed in U.S. Pat. No. 3,364,157, issued Jan. 16, 1968 to Halek et al and also assigned to Celanese Corporation.

b. Elastomer/Oxymethylene Graft Polymers

U.S. Pat. No. 3,392,118, issued July 9, 1968 to Isaacson et al, discloses preparing "polymeric formals" which range from viscous liquids to elastomeric solids [molecular weights up to 25,000 (Staudinger)] by condensing a hydroxyl-containing diene polymer, such as a hydroxylated polybutadiene, having a molecular weight of up to about 12,000 (Staudinger) with formaldehyde in the presence of an acid catalyst. Chloroprene is among the typical dienes disclosed by Isaacson et al for use in making their hydroxyl-containing diene polymers. Nonetheless, the entire emphasis in the Isaacson et al patent is on forming oxymethylene graft chains on the hydroxyl-containing diene polymer by reacting formaldehyde with hydroxyl end groups introduced into the diene polymer during peroxide-catalyzed polymerization.

U.S. Pat. No. 4,136,136, issued Jan. 12, 1979 to Dreyfuss et al, discloses grafting polymer chains made up of certain small ring hetero-O, -S or -N compounds from the backbones of halogenated elastomeric polymers under cationic polymerization conditions. Among the small ring monomers disclosed by Dreyfuss et al are cyclic ethers such as tetrahydrofuran, cyclic formals such as 1,3-dioxolane and cyclic epoxides such as propylene oxide, while the halogenated elastomeric backbone polymers disclosed include chlorinated butadiene, chlorinated SBR, PVC, chlorinated EPR, chlorinated EPDM, neoprene and chlorobutyl rubber. And Dreyfuss et al disclose that silver salt catalysts are particularly useful in carrying out their graft polymerizations; see also Dreyfuss et al, *J. Polymer Sci.:* Symposium No. 56, 129–137 (1976). It has now been determined experimentally, however, that trioxane, another small ring hetero-O monomer (and one commonly employed, together with cyclic ethers, formals, etc. having at least two adjacent carbon atoms, to prepare oxymethylene copolymers), will not react under cationic polymerization conditions such as those disclosed in the Dreyfuss et al patent and article to graft polyformaldehyde [poly(oxymethylene)] chains onto halogenated elastomer backbones.

Soluble copolymers of tetrahydrofuran grafted onto Neoprene W, prepared in the presence of nitrosyl and nitryl hexafluorophosphates, are disclosed by Eckstein et al in *J. Polym. Sci.; Polym. Chem. Ed.*, 17, 4115–4121 (1979).

U.S. Pat. Nos. 3,555,121, issued Jan. 12, 1971 to Tanaka et al and 3,872,182, issued Mar. 18, 1975 to Sextro et al, disclose grafting trioxane-cylic ether or -cyclic acetal chains onto various unhalogenated polymer backbones, including backbones having pendant alcohol ester or acid ester groups which act as grafting sites, under cationic polymerization conditions.

None of the aforementioned literature articles and patents teach the grafting of polyformaldehyde [poly(oxymethylene)] or oxymethylene copolymer chains onto halogenated diene polymer backbones or the use of such graft polymers as compatibilizing agents for elastomer/oxymethylene polymer blends.

SUMMARY OF THE INVENTION

It has now been discovered that the impact strength or resistance of elastomer/oxymethylene polymer blends can be enhanced, with no appreciable diminution in their other useful properties, by the inclusion in such blends of a novel polymeric compatibilizing agent prepared by grafting polyformaldehyde [poly(oxymethylene)] or oxymethylene copolymer chains onto a halogenated elastomeric polymer. Such grafts are accomplished by means of a reaction initiated at the graft sites, i.e., at the sites of the haloelastomer's halo substituents, using an initiated site-forming cationic salt as hereinafter described. The reaction involving the haloelastomer, the cationic salt and formaldehyde, and if present a cyclic ether, cyclic formal or similar oxygen-containing cyclic comonomer having at least two adjacent carbon atoms, results in the haloelastomer's halo substituents being replaced by polyformaldehyde [poly(oxymethylene)] or oxymethylene copolymer chains.

While we do not wish to be bound by any particular reaction mechanism or theory advanced to explain the manner in which these polyformaldehyde [poly(oxymethylene)] or oxymethylene copolymer-grafted elastomers are formed, it appears that by dissolving a haloelastomer precursor in a solvent therefor which contains a suitable initiated site-forming material (and which also contains, when grafting oxymethylene copolymer chains, a cyclic ether or cyclic formal containing at least two adjacent carbon atoms) and then bubbling formaldehyde through the solution, unambiguous initiated sites for cationic polymerization are first formed on the haloelastomer's backbone at the points at which its halogen substituents were attached. Polyformaldehyde [poly(oxymethylene)] and oxymethylene copolymer chains of the types described hereinbelow will readily form at these initiated sites. This reaction can be illustrated for polyformaldehyde-grafted chlorobutyl rubber chains as follows:

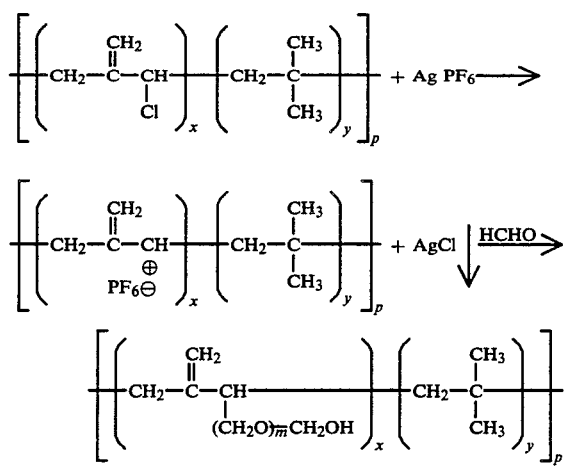

wherein x, y, m and p are integers indicating the presence of polymer chains and units thereof.

Similarly, the reaction between formaldehyde, a cyclic ether or cyclic formal, e.g., ethylene oxide, and a haloelastomer which has been contacted with a suitable initiated site-forming material, e.g., chloroprene initiated with AgPF$_6$, can be illustrated as follows, wherein x, m and q are integers indicating the presence of polymer chains and units thereof:

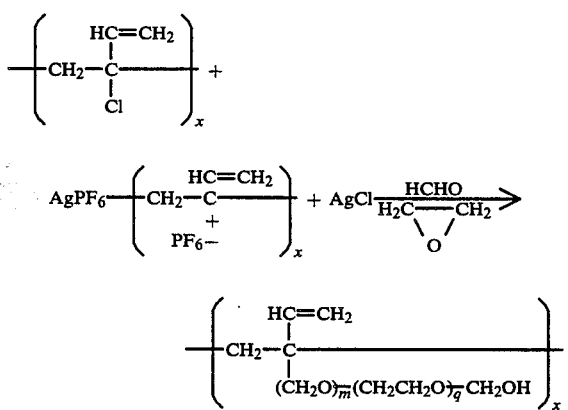

DETAILED DESCRIPTION OF THE INVENTION

The Oxymethylene Polymer

Oxymethylene polymers useful in preparing the elastomer/oxymethylene polymer blends of this invention are well known in the art. Such polymers are characterized as having recurring oxymethylene groups or units, i.e., —CH$_2$O— groups. The term oxymethylene polymer as used herein is intended to include any oxymethylene polymer having oxymethylene groups which comprise at least about 50 percent, and generally at least about 85 percent, of the polymer's recurring units, i.e., homopolymers, copolymers, terpolymers and the like.

Typically, oxymethylene homopolymers, or polyformaldehydes or [poly(oxymethylenes)], are prepared by polymerizing anhydrous formaldehyde or trioxane, a cyclic trimer of formaldehyde. For example, high molecular weight polyoxymethylenes have been prepared by polymerizing trioxane in the presence of certain fluoride catalysts, such as antimony fluoride. Polyoxymethylenes may also be prepared in high yields and at rapid reaction rates by the use of catalysts comprising boron fluoride coordination complexes with organic compounds, as described in U.S. Pat. No. 2,898,506 to Hudgin et al.

Oxymethylene homopolymers are usually stabilized against thermal degradation by end-capping with, for example, ester or ether groups such as those derived from alkanoic anhydrides, e.g., acetic anhydride, or dialkyl ethers, e.g., dimethyl ether, or by incorporating stabilizer compounds into the homopolymer, as described in U.S. Pat. No. 3,133,896 to Dolce et al.

Oxymethylene copolymers are particularly adapted for use in the blends of this invention, and may be prepared as described in U.S. Pat. No. 3,027,352 to Walling et al by copolymerizing trioxane with a cyclic ether or cyclic formal having at least two adjacent carbon atoms, e.g., ethylene oxide, dioxolane, 1,4-butanediolformal, and the like.

Oxymethylene copolymers which are especially suitable for use in the blends of this invention will usually possess a relatively high level of polymer crystallinity, i.e., about 70 to 80 percent or higher. These preferred oxymethylene copolymers have repeating units which consist essentially of oxymethylene groups interspersed with oxy(higher)alkylene groups represented by the general formula:

$$-O-\underset{\underset{R_1}{|}}{\overset{\overset{R_2}{|}}{C}}-\underset{\underset{R_1}{|}}{\overset{\overset{R_2}{|}}{C}}-(R_3)_n$$

wherein each R$_1$ and R$_2$ is hydrogen or a lower alkyl group, each R$_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

Oxymethylene groups generally will constitute from about 85 to about 99.9 percent of the recurring units in such copolymers. The oxy(higher)alkylene groups incorporated into the copolymer during copolymerization produce the copolymer by the opening of the ring of a cyclic ether or cyclic formal having at least two adjacent carbon atoms, i.e., by the breaking of an oxygen-to-carbon linkage.

Copolymers of the desired structure may be prepared by polymerizing trioxane together with from about 0.1 to about 15 mol percent of a cyclic ether or cyclic formal having at least two adjacent carbon atoms, preferably in the presence of a catalyst such as a Lewis acid (e.g., BF$_3$, PF$_5$, and the like) or other acids (e.g., HClO$_4$, 1% H$_2$SO$_4$, and the like), ion pair catalysts, etc.

In general, the cyclic ethers and cyclic formals employed in making these preferred oxymethylene copolymers are those represented by the general formula:

$$\underset{R_1CR_2-(R_3)_n}{\overset{R_1CR_2-O}{\underset{|}{|}\phantom{xx}\underset{|}{|}}}$$

wherein each R$_1$ and R$_2$ is hydrogen or a lower alkyl group, each R$_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

The cyclic ether and cyclic formal preferred for use in preparing these preferred oxymethylene copolymers are ethylene oxide and 1,3-dioxolane, respectively. Other cyclic ethers and cyclic formals that may be employed are 1,3-dioxane, trimethylene oxide, 1,2-propylene oxide, 1,2-butylene oxide, 1,3-butylene oxide, 1,4-butanediolformal, and the like.

Oxymethylene copolymers produced from the preferred cyclic ethers have a structure composed susbstantially of oxymethylene and oxy(lower)alkylene, preferably oxyethylene groups, and are thermoplastic materials having a melting point of at least 150° C. They normally are millable or processable at temperatures ranging from 180° C. to about 200° C., and have a number average molecular weight of at least 10,000 and an inherent viscosity of at least 1.0 (measured at 60° C. in a 0.1 weight percent solution in p-chlorophenol containing 2 weight percent of α- pinene).

These oxymethylene copolymers preferably are stabilized to a substantial degree prior to incorporating them into the blends of this invention. This can be accomplished by degradation of unstable molecular ends of the polymer chains to a point where a relatively stable carbon-to-carbon linkage exists at each end of each chain. Such degradation may be effected by hydrolysis, as disclosed, for example, in U.S. Pat. No. 3,219,623 to Berardinelli.

The oxymethylene copolymer may also be stabilized by end-capping, again using techniques well known to those skilled in the art. End-capping is preferably accomplished by acetylation with acetic anhydride in the presence of sodium acetate catalyst.

A particularly preferred class of oxymethylene copolymers is commercially available from Celanese Corporation under the designation CELCON® acetal copolymer, and especially preferred is CELCON® M25 acetal copolymer, which has a melt index of about 2.5 g/10 min. when tested in accordance with ASTM D1238-82.

Oxymethylene terpolymers may be prepared, for example, by reacting trioxane, a cyclic ether or cyclic acetal and, as the third monomer, a bifunctional compound such as a diglycide of the formula:

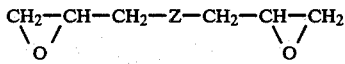

wherein Z represents a carbon-to-carbon bond, an oxygen atom, an oxy-alkoxy group of 1 to 8 carbon atoms, preferably 2 to 4 carbon atoms, which may be an oxycycloalkoxy group of 4 to 8 carbon atoms or an oxy-poly(-lower alkoxy) group, preferably one having from 2 to 4 recurring groups each with 1 or 2 carbon atoms, for example, ethylene diglycide, diglycidyl ether and diethers of 2 mols of gylcide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propanediol, cyclohexane-1,4-diol and 2-dimethyl-4-dimethyl-cyclobutane-1,3-diol, with butanediol diglycidyl ethers being most preferred.

Generally, when preparing such terpolymers, ratios of from 99.89 to 89.0 weight percent trioxane, 0.1 to 10 weight percent of the cyclic ether or cyclic acetal and 0.01 to 1 weight percent of the bifunctional compound are preferred, these percentages being based on the total weight of monomers used in forming the terpolymer. Ratios of from 99.85 to 89.5 weight percent of trioxane, 0.1 to 10 weight percent of cyclic ether or cyclic acetal and 0.05 to 0.5 weight percent of diglycidyl ether are particularly preferred, these percentages again being based on the total weight of monomers used in forming the terpolymer.

Terpolymer polymerization may be carried out according to known methods of solid, solution or suspension polymerization. As solvents or suspending agents, one may use inert aliphatic or aromatic hydrocarbons, halogenated hydrocarbons or ethers.

Trioxane-based terpolymer polymerization is advantageously carried out at temperatures at which trioxane does not crystallize out, that is, at temperatures within the range of from about −50° C. to about +100° C.

Cationic polymerization catalysts, such as organic or inorganic acids, acid halides and, preferably, Lewis acids, can be used in preparing the terpolymers. Of the latter, boron fluoride and its complex compounds, for example, etherates of boron fluoride, are advantageously used. Diazonium fluoroborates are particularly advantageous.

Catalyst concentration may be varied within wide limits, depending on the nature of the catalyst and the intended molecular weight of the terpolymer. Thus, catalyst concentration may range from about 0.0001 to about 1 weight percent, and preferably will range from about 0.001 to about 0.1 weight percent, based on the total weight of the monomer mixture.

Since catalysts tend to decompose the terpolymer, the catalyst is advantageously neutralized immediately after polymerization using, for example, ammonia or methanolic or acetonic amine solutions.

Unstable terminal hemiacetal groups may be removed from the terpolymer in the same manner as they are from other oxymethylene polymers. Advantageously, the terpolymer is suspended in aqueous ammonia at temperatures within the range of from about 100° C. to about 200° C., if desired in the presence of a swelling agent such as methanol or n-propanol. Alternatively, the terpolymer is dissloved in an alkaline medium at temperatures above about 100° C. and subsequently reprecipitated. Suitable alkaline media include benzyl alcohol, ethylene glycol monoethyl ether, or a mixture of 60 weight percent methanol and 40 weight percent water containing ammonia or an aliphatic amine.

The terpolymers may also be thermally stabilized by degrading unstable molecular ends of their chains to a point where a relatively stable carbon-to-carbon linkage exists at each end of each chain. Thermal stabilization will preferably be carried out in the absence of a solvent in the melt, in the presence of a thermal stabilizer.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent by weight, based on the weight of the terpolymer. The resulting mixture is maintained at a temperature in the range of from about 170° C. to 250° C. for a specified period of time, and then washed with water and dried or centrifuged.

A preferred oxymethylene terpolymer is commercially available from Celanese Corporation under the designation CELCON ® U10 acetal polymer, and is a butanediol diglycidyl ether/ethylene oxide/trioxane terpolymer containing about 0.05 weight percent, 2.0 weight percent, and 97.95 weight percent of repeating units derived from these termonomers, respectively, based on the total weight of these termonomers.

Oxymethylene polymers admixed with plasticizers, formaldehyde scavengers, mold lubricants, antioxidants, fillers, colorants, reinforcing agents, light stabilizers and other stabilizers, pigments, and the like, can be used in the blends of this invention so long as such additives do not materially affect such blends' desired properties, particularly enhancement of impact strength, as manifested in articles molded therefrom.

Suitable formaldehyde scavengers include cyanoguanidine, melamine and melamine derivatives, such as lower alkyl- and amine-substituted triazines, amidines, polyamides, ureas, metal oxides and hydroxides, such as calcium hydroxide, magnesium hydroxide, and the like, salts of carboxylic acids, and the like. Cyanoguanidine is the preferred formaldehyde scavenger. Suitable mold lubricants include alkylene bisstearamide, long-chain amides, waxes, oils, and polyether glycides. A preferred mold lubricant is commercially available from Glyco Chemical, Inc. under the designation Acrawax C, and is an alkylene bisstearamide. The preferred antioxidants are hindered bisphenols. Especially preferred is 1,6-hexamethylene bis-(3,5-di-t-butyl-4-hydroxyhydrocinnamate), commercially available from Ciba-Geigy Corp. under the designation Irganox 259.

A most preferred oxymethylene copolymer for use in the blends of this invention is commercially available from Celanese Corporation under the designation CELCON ® M25-04 acetal polymer. This oxymethylene copolymer has a melt index of about 2.5 g/10 min. and contains 0.5 percent by weight Irganox 259, 0.1 percent by weight cyanoguanidine, and 0.2 percent by weight Acrawax C.

A most preferred oxymethylene terpolymer for use in the blends of this invention is commercially available from Celanese Corporation under the designation CELCON ® U10-11 acetal polymer. This is the previously mentioned CELCON ® U-10 acetal terpolymer stabilized by 0.5 percent by weight Irganox 259 and 0.1 percent by weight calcium ricinoleate.

The Elastomer

The elastomeric materials useful in preparing the blends of this invention are also well known in the art. They include any natural or synthetic elastomer whose backbone is free of substituents which, in sufficient amounts, could adversely affect the thermal stability of the oxymethylene polymer: halogens, particularly chlorine, bromine or iodine, halogen-containing substituents, e.g., halo-lower alkyl or haloaryl groups, acid groups, e.g., carboxyl or carboxy-substituted lower alkyl groups, or the like. The elastomeric material itself should be free of entrained substances or residues detrimental in like manner to the oxymethylene polymer: active chlorine, bromine or iodine, decidedly acidic processing aids or residues thereof, acidic catalyst residues, and the like. The elastomer backbone, whether substituted or unsubstituted, preferably although not necessarily will also be capable of being halogenated in known manner to provide sites onto which oxymethylene polymer chains can be grafted in accordance with this invention to thus produce preferred compatibilizing agents useful in the elastomer/oxymethylene polymer blends of this invention.

Included among such elastomers are polymeric materials having a glass transition temperature [Illers et al, *Kolloid-Zeitschrift*, 176 (1961), p. 110] of less than 0° C., and preferably less than −30° C. Natural rubber is one such material. Diene polymers prepared from unsubstituted, 2-substituted or 2,3-disubstituted 1,3-dienes of up to about 12 carbon atoms, and preferably up to 6 carbon atoms, which if substituted will have substituents such as lower alkyl groups of 1 to 4 carbon atoms, aryl groups (unsubstituted or substituted with one or more lower alkyl, aryl, lower alkoxy or like groups non-reactive with the oxymethylene polymer) in the 2-,3- or 2,3-positions, can also be used. Such diene polymers include ones prepared from 1,3-butadiene, isoprene, 2,3-dimethyl-1,3-butadiene, 1-methoxy-1,3-butadiene, 2-methoxy-1,3-butadiene, 1-phenyl-1,3-butadiene, and the like.

Ethylenically unsaturated comonomers are often used in preparing these diene polymers, usually in amounts ranging from about 20 percent to about 80 percent by weight, based on the total weight of monomers employed. Included among such comonomers are α-monoolefinic monomers of from 2 to 12 carbon atoms, and preferably 3 to 10 carbon atoms, such as ethylene, propylene, butene-1, and the like, vinyl aromatic comonomers such as styrene, vinyl toluene, and the like. One or several such comonomers may be employed, if desired.

Such diene polymers are prepared by methods well known in the art, and those used in the blends of this invention will preferably be solids at room temperature.

The Compatibilizing Agent

The compatibilizing agents of this invention are prepared, as indicated above, by grafting polyformaldehyde [poly(oxymethylene)] or oxymethylene copolymer chains onto a halogenated elastomer backbone. The backbone polymer can be inherently halogenated, i.e., can be one prepared using a halogenated monomer as all or part of the polymerizable monomer staring material, or can be prepared from an unhalogenated elastomer by post-polymerization halogenation. Chlorination of the unhalogenated elastomer with t-butylhypochlorite or elemental chlorine, or halogenation with bromine or iodine, again carried out in known manner, can be employed to provide the halogenated elastomer precursors of the compatibilizing agents of this invention.

Among the elastomers useful as such halogenated precursors are, as mentioned above, any of the halogenated counterparts of those natural or synthetic elastomers used to form blends with oxymethylene polymers in accordance with this invention, including the aforementioned diene polymers, and analogs of such diene polymers prepared from one or more halogenated dienes or halogenated ethylenically unsaturated comonomers, or mixtures thereof. Particularly useful are halogenated elastomers such as polychloroprene, chlorobutyl rubber, bromobutyl rubber, chlorinated polybutadiene, chlorinated styrene-butadiene elastomers, chlorinated EPDM-1, chlorinated EPDM-2, and the like. Such elastomers can be liquids or solids (liquid elastomers will become solids once grafted with polyformaldehyde [poly(oxymethylene)] or oxymethylene copolymer chains), and thus can have weight average molecular weights of about 2000 and up.

Formaldehyde is used to graft polyformaldehyde [poly(oxymethylene)] chains, i.e., chains having the structure:

$$-(CH_2O)_{n^1}CH_2OH$$

wherein $n^1$ is an integer of from about 25 to about 5000, preferably from about 2000 to about 4000, onto initiated sites on an elastomeric polymer backbone, by the reaction of a cationic salt with a halogenated precursor of the elastomeric polymer, thus replacing all or a substantial portion, i.e., at least about 80% to about 95%, and preferably all or substantially all of the halo substituents on the precursor's backbone. The formaldehyde can be bubbled into the reaction zone from an outside source, and thus can be formaldehyde itself or formaldehyde obtained from a formaldehyde-generating precursor, e.g., a low molecular weight formaldehyde polymer such as paraformaldehyde, metaformaldehyde (1,3,5-trioxane), or the like. The amount of formaldehyde which can be employed may be varied within wide limits, but preferably will range from about 50 to about 80 weight percent, and preferably from about 70 to about 75 weight percent, based on the total weight of formaldehyde and halogenated elastomer used.

When grafting oxymethylene copolymer chains onto initiated sites on an elastomeric polymer backbone, i.e., chains having the structure:

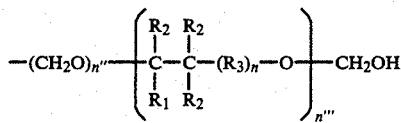

wherein $R_1$ and $R_2$ are hydrogen or a lower alkyl group, $R_3$ is a methylene group, an oxymethylene group, a lower alkyl-substituted methylene group or a lower alkyl-substituted oxymethylene group, n is an integer from zero to three, inclusive, $n''$ and $n'''$ are integers the sum of which is from about 25 to about 5000, preferably from about 2000 to about 4000, and from about 85 to about 99.9 percent of the integers represented by $n''$ plus $n'''$ are oxymethylene groups, formaldehyde can once again be bubbled into the reaction zone from an outside source of formaldehyde, i.e., formaldehyde per se or a formaldehyde-generating precursor, and the cyclic ether or cyclic formal comonomer, i.e., a comonomer having at least two adjacent carbon atoms which engenders oxy(higher)alkylene groups represented by formula I above preferably ethylene oxide, dioxolane, 1,4-butanediol formal or the like, will be present in the reaction zone in amounts sufficient to give from about 0.1 to about 15 percent of recurring oxy (higher) alkylene units in the grafted oxymethylene copolymer chains.

The rate at which formaldehyde will be bubbled through the reaction zone when grafting polyformaldehyde [poly(oxymethylene)] chains onto initiated sites on an elastomeric polymer backbone will be somewhat more rapid than when grafting oxymethylene copolymer chains; see Collins et al, *J. Polym. Sci.: Polym. Chem. Ed.*, 19, 1597–1607 (1981) at 1604–5. Neither rate is critical. Thus, when conducting the former reaction formaldehyde gas can be introduced at a rate of from about 0.10 to about 0.30 grams/minute, and preferably at from about 0.15 to about 0.25 grams/minute, while when grafting oxymethylene copolymer chains formaldehyde gas can be introduced at a rate of from about 0.05 to about 0.20 grams/minute, and preferably at from about 0.10 to about 0.15 grams/minute.

When grafting oxymethylene copolymer chains onto the initiated elastomeric polymer backbone the cationic salts present in the reaction zone also serve as copolymerization catalysts for the formation of the oxymethylene copolymer chains.

The cationic salts employed in the grafting reaction to give rise to the initiated sites on the elastomeric polymer backbone will ordinarily be employed in at least stoichiometric amounts, and preferably in excess thereof (e.g., a 10 to 50% or greater excess), based on the total amount of halogen in the halogenated elastomeric precursor. Such salts include silver salts such as $AgPF_6$, $AgBF_4$, $AgClO_3$, $AgAsF_6$, $AgSbCl_6$, $AgSbF_6$, $AgOSO_2CF_3$, and the like, and nitrosyl compounds such as $NOPF_6$ (nitrosyl hexafluorophosphate), $NO_2PF_6$ (nitryl hexafluorophosphate), and the like.

The use of at least a stoichiometric amount of the initiated site-forming substance, and preferably an excess, facilitates removal of halogen from the grafted elastomeric compatibilizing agent. Halogens can react with formaldehyde to form halomethyl ethers, which are known carcinogens. Removing halogen from the grafted elastomer will eliminate the possibility of such a reaction occurring with any formaldehyde contained in or liberated by the oxymethylene polymer with which the grafted elastomer is ultimately blended.

The grafting reaction will be carried out at temperatures ranging from room temperature (about 25° C.) to the boiling point of the solvent employed, until maximum grafting has been accomplished. Any polar solvent which will dissolve the haloelastomer precursor and any cyclic ether or cyclic formal employed, e.g., aromatic hydrocarbons such as benzene, toluene, xylene or the like, halogenated hydrocarbons such as methylene dichloride, chlorobenzene or the like, nitroalkanes such as nitromethane, nitroethane or the like, nitriles such as acetonitrile or the like, inert ethers such as tetrahydrofuran, tetrahydropyran or the like, and other high dielectric solvents, and mixtures thereof, will preferably be used. For example, a mixture of from about 30 to about 70 parts by volume of toluene and, correspondingly, from about 70 to about 30 parts by volume of nitromethane, and preferably a 50:50 mixture, by volume, of these two solvents can be used to carry out the grafting reaction.

The resulting graft polymers will generally contain graft polyformaldehyde [poly(oxymethylene)] or oxymethylene copolymer branches in amounts ranging from about 20 to about 80 weight percent, and preferably from about 30 to about 60 weight percent, based on the total weight of the graft copolymer.

The hydroxymethyl end groups ($-CH_2OH$) on graft polyformaldehyde [poly(oxymethylene)] branches, and any such end groups on oxymethylene copolymer branches, may be end-capped, if desired, in the manner described above in connection with the oxymethylene homopolymers which can be blended with elastomers in accordance with this invention, using, for example, acetic anhydride as the end-capping agent.

The Blends

Blended polymeric molding compositions prepared in accordance with this invention will generally comprise:

(1) from about 5 to about 50 weight percent, and preferably from about 20 to about 30 weight percent, of the rubbery elastomer, (2) from about 50 to about 95 weight percent, and preferably from about 70 to about 80 weight percent, of the oxymethylene polymer, and (3) from about 2 to about 15 weight percent, and preferably from about 5 to about 10 weight percent, of the solid elastomer/oxymethylene graft copolymer compatibilizing agent prepared as described hereinabove by grafting from about 20 to about 80 weight percent, based on the total weight of the graft copolymer, of oxymethylene polymer chains which are formaldehyde chains having the structure:

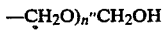

or oxymethylene copolymer chains having the structure:

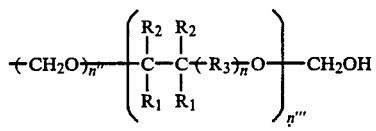

wherein $R_1$ and $R_2$ are hydrogen or a lower alkyl group, $R_3$ is a methylene group, an oxymethylene group, a lower alkyl-substituted methylene group or a lower alkyl-substituted oxymethylene group, n is an integer from zero to three, inclusive, n' is an integer of from about 25 to about 5000, and preferably from about 2000 to about 4000, and n'' and n''' are integers the sum of which is from about 25 to about 5000, and preferably from about 2000 to about 4000, with from about 85 to about 99.9 percent of the integers represented by n'' plus n''' being oxymethylene groups, onto initiated sites on an elastomeric polymer backbone, the initiated sites having been introduced into the backbone by the reaction of a cationic salt with a halogenated counterpart of the elastomeric polymer, the weight percentages of components (1), (2), (3) in all cases totaling 100% and being based on the total weight of these polymeric components present in the molding composition.

These blends may be prepared by any conventional procedure that will result in a uniform blend or admixture of the components. Preferably, dry or melt blending procedures and equipment are used. For example, the elastomer (in the form of pellets, chips or granules) can be dry mixed with the oxymethylene polymer (in the form of pellets, chips, flakes, granules or powder) and the compatibilizing agent, typically at room temperature (about 25° C.), and the resulting mixture melt blended in any conventional type extrusion equipment, which is customarily heated to a temperature of from about 170° C. to about 200° C., and preferably from about 180° C. to about 190° C. The sequence of addition of components (1), (2) and (3) is not critical, and any conventional means may be used to form the uniform admixture.

Preferably, the elastomer, the oxymethylene polymer and the compatibilizing agent are dried (either individually or together) before being subjected to the blending procedure. Drying can be done in desiccated air having a dew point of about −30° C. to −40° C. or lower, at a temperature of from about 70° C. to about 110° C. The drying time will depend primarily on the moisture content, drying temperature, and particular equipment employed, but typically is from about 2 to about 6 hours or more. If the drying is conducted for longer periods of time, such as overnight, the drying temperature should preferably be about 70° C. to about 85° C. In general, any conventional drying procedure can be used to reduce the moisture content to below about 0.1 weight percent, based on the total weight of the elastomer, oxymethylene polymer and compatibilizing agent, preferably below about 0.05 weight percent, and most preferably below about 0.01 weight percent.

If conventional mold lubricants, plasticizers, fillers (particularly glass in the form of filaments or strands, beads, dust or microbubbles, any of which forms can be sized or otherwise combined with coupling agents), nucleating agents, antioxidants, formaldehyde scavengers, chain scission inhibitors, ultraviolet light inhibitors and similar molding additives have not previously been added to the elastomer or the oxymethylene polymer during the processing of these individual components of the blend, i.e., before they are admixed with each other and with the compatibilizing agent, they may be added at this time.

The uniform admixture resulting from the blending procedure is then comminuted mechanically, for example by chopping, pelletizing or grinding, into granules, pellets, chips, flakes or powders, and processed in the thermoplastic state, for example by injection molding or extrusion molding into shaped articles, including bars, rods, plates, sheets, films, ribbons, tubes, and the like.

Preferably, the comminuted blend is dried again, in the manner discussed above, prior to being molded.

In order that those skilled in the art can more fully understand this invention, the following examples are set forth. These examples are given solely for purposes of illustration, and should not be considered as expressing limitations unless so set forth in the appended claims. All parts and percentages are by weight, unless otherwise stated.

COMPARATIVE EXAMPLE 1

Bromobutyl rubber, 4.5 grams, is stirred into a mixture of 300 ml of xylene (which has been dried over molecular sieves to reduce moisture), 75 ml of methylene chloride (also dried over molecular sieves) and 50 ml of trioxane (dried over sodium/potassium metal at 25° C.) The mixture is initially cloudy due to incomplete solubility of the bromobutyl rubber. However, upon the addition of 0.5 ml of a silver hexafluorophosphate solution prepared by dissolving 1.003 grams of silver hexafluorophosphate in 50 ml of dry methylene chloride, the cloudiness largely disappears, indicating that the silver salt reacts with bromine atoms on the bromobutyl rubber to form ionic sites, resulting in increased solubility.

A slight increase in the viscosity of the resulting solution is noted, but no evidence is found of either the reaction of trioxane to form poly(oxymethylene), a white, solid material, or of the grafting of poly(oxymethylene) chains onto the ionic sites on the bromobutyl rubber backbone, even after six days at room temperature.

EXAMPLE I

Chlorobutyl rubber, 9.98 grams, is added to 100 ml of tetrahydrofuran (which has been dried over molecular sieves to reduce mositure) in a stirred reactor at 25° C. Next, 3 ml of a silver hexafluoroarsenate solution (prepared by dissolving 0.9898 gram of silver hexafluoroarsenate in 30 ml of dry tetrahydrofuran) are added while stirring is continued.

In a separate flask 7 grams of paraformaldehyde are heated to a temperature of 120° C. to generate formaldehyde gas, and this gas is bubbled into the chlorobutyl rubber/silver salt solution over a period of 45 minutes, with continued stirring. During this formaldehyde addition, the reactor contents become extremely viscous and white, with insoluble particles becoming visible. At the end of this time, a chalky, white material having a somewhat elastic texture is recovered from the reactor. This material is insoluble in tetrahydrofuran (a solvent for the chlorobutyl rubber starting material) and in hexafluoroisopropanol [a solvent for poly(oxymethylene) polymer], thus giving an initial indication that poly(oxymethylene) chains are grafted onto the ionic sites formed on the chlorobutyl rubber backbone by the silver hexafluoroarsenate salt. Analyses by DSC, TGA, XPS and SEM microscopy support this conclusion.

EXAMPLES II-V

By repeating the procedure of Example I using the halogenated elastomers and cationic salts listed in Table I below in place of chlorobutyl rubber and silver hexafluoroarsenate, the corresponding poly(oxymethylene)-grafted elastomers are prepared.

TABLE I

| Example | Halogenated Elastomer | Cationic Salt |
| --- | --- | --- |
| II | polychloroprene | silver hexafluorophosphate |
| III | bromobutyl rubber | silver perchlorate |
| IV | chlorinated polybutadiene | silver hexafluoroarsenate |
| V | chlorinated styrene-butadiene elastomer | nitrosyl hexafluorosphate |

EXAMPLE VI

Bromobutyl rubber, 10 grams, is added to 100 ml of tetrahydrofuran (which has been dried over molecular sieves to reduce moisture) and 1 gram of ethylene oxide (also dried over molecular sieves) in a stirred reactor at 25° C. Next 4 ml of a silver hexafluorophosphate solution (prepared by dissolving 0.9899 grams of silver hexafluorophosphate in 30 ml of dry tetrahydrofuran) are added while stirring is continued.

In a separate flask paraformaldehyde, 7 grams, is heated to a temperature of 120° C. to generate formaldehyde gas, and this gas is bubbled into the bromobutyl rubber/ethylene oxide/silver salt solution over a period of 3 hours, with continued stirring. During this formalde addition, the reactor contents become extremely viscous and white, with insoluble particles becoming visible. At the end of this time, a chalky, white material having a somewhat elastic texture is recovered from the reactor. This material is insoluble in tetrahydrofuran (a solvent for the bromobutyl rubber starting material) and in hexafluoroisopropanol (a solvent for trioxane-ethylene oxide oxymethylene copolymers), thus giving an initial indication that oxymethylene copolymer chains are grafted onto the ionic sites formed on the bromobutyl rubber backbone by the silver hexafluorophosphate salt.

EXAMPLES VII-IX

By repeating the procedure of Example VI using the halogenated elastomers, cyclic ether monomers and cationic salts listed in Table II below, the corresponding oxymethylene copolymer-grafted elastomers are prepared.

TABLE II

| Example | Halogenated Elastomer | Cyclic Ether Monomer | Cationic Salt |
| --- | --- | --- | --- |
| VII | chlorinated polybutadiene | 1,3-dioxolane | silver hexafluoroarsenate |
| VIII | chlorinated styrene-butadiene elastomer | 1,4-butanediol formal | nitrosyl hexafluorophosphate |
| IX | polychloroprene | 1,3-butylene oxide | silver perchlorate |

EXAMPLES X-XIII

A trioxane/ethylene oxide copolymer containing about 2 percent of monomeric units derived from ethylene oxide is prepared as described in U.S. Pat. No. 3,027,352 to Walling et al. The resulting oxymethylene copolymer has an inherent viscosity of about 1.3 (measured at 60° C. in a 0.1 percent solution of p-chlorophenol containing 2.0 percent α-pinene), a number average molecular weight of approximately 35,000, a crystallinity of about 75%, a melting temperature of 165° C., and a melt index of about 2.5 g/10 min. (measured in accordance with ASTM D-1238-82). The oxymethylene copolymer is then blended with 0.5 percent Irganox 259 (antioxidant), 0.1 percent cyanoguanidine (formaldehyde scavenger) and 0.2 percent Acrawax C (mold lubricant), these amounts of additives being based on the total weight of oxymethylene copolymer and additives, and then formed into flakes, about 70% of which pass through a 40 mesh screen.

The resulting flake copolymer is dried in dessicated air having a dew point of −30° C. at a temperature of 80° C. for 4 hours to reduce moisture, then blended in the amounts listed in Table III below with the amounts of dried elastomer and compatibilizing agent also listed in Table III, using a ZSK extruder, at a temperature of 180° C. The resulting molding pellets, when molded using standard conditions, provide molded articles having enhanced impact strength and good oxymethylene polymer-elastomer compatibility.

TABLE III

| Example | Oxymethylene Copolymer, % | Elastomer, % | Compatibilizing Agent, % |
| --- | --- | --- | --- |
| X | 70% | Poly (1,3-butadiene), 28% | Poly(oxymethylene)-grafted chlorobutyl rubber of Example I, 2% |
| XI | 80% | Poly (1,3-butadiene), 15% | Poly(oxymethylene)-grafted bromobutyl rubber of Example III, 5% |
| XII | 75% | Polyisoprene, 22% | Oxymethylene copolymer-grafted bromobutyl rubber of Example VI, 3% |
| XII | 75% | Styrene-butadiene elastomer, | Poly(oxymethylene)-grafted chlorobutyl |

TABLE III-continued

| Example | Oxymethylene Copolymer, % | Elastomer, % | Compatibilizing Agent, % |
|---------|---------------------------|--------------|--------------------------|
|         |                           | 28%          | rubber of Example I, 2%  |

The above discussion and related illustrations of this invention are directed primarily to preferred embodiments and practices thereof. It will be readily apparent to those skilled in the art, however, that numerous changes and modifications in the actual implementation of the concepts described herein can readily be made without departing from the spirit and scope of the invention as defined by the following claims.

We claim:

1. A solid graft copolymer prepared by grafting from about 20 to about 80 weight percent, based on the total weight of the graft copolymer, of oxymethylene polymer chains which are polyformaldehyde chains having the structure:

$$-(CH_2O)_{n'}CH_2OH$$

or oxymethylene copolymer chains having the structure:

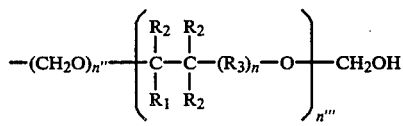

wherein $R_1$ and $R_2$ are hydrogen or a lower alkyl group, $R_3$ is a methylene group, an oxymethylene group, a lower alkyl-substituted methylene group or a lower alkyl-substituted oxymethylene group, n is an integer from zero to three, inclusive, n' is an integer of from about 25 to about 5000, and n" and n''' are integers the sum of which is from about 25 to about 5000, with from about 85 to about 99.9 percent of the integers represented by n" plus n''' being oxymethylene groups, onto initiated sites on an elastomeric polymer backbone, the initiated sites having been introduced into the backbone by the reaction of a cationic salt with a halogenated precursor of the elastomeric polymer.

2. A solid graft copolymer as in claim 1 wherein the oxymethylene polymer chains are polyformaldehyde chains present in an amount of from about 30 to about 60 weight percent, based on the total weight of the graft copolymer.

3. A solid graft copolymer as in claim 1 wherein the oxymethylene polymer chains are oxymethylene copolymer chains present in an amount of from about 30 to about 60 weight percent, based on the total weight of the graft copolymer.

4. A solid graft copolymer as in claim 1 wherein the oxymethylene polymer chains are oxymethylene copolymer chains present in an amount of from about 30 to about 60 weight percent, based on the total weight of the graft copolymer and comprising oxymethylene and oxyethylene groups.

5. A solid graft copolymer as in claim 2 wherein n' is an integer of from about 2000 to about 4000.

6. A solid graft copolymer as in claim 5 wherein the halogenated precursor is bromobutyl rubber.

7. A solid graft copolymer as in claim 5 wherein the halogenated precursor is chlorobutyl rubber.

8. A solid graft copolymer as in claim 5 wherein the halogenated precursor is polychloroprene.

9. A solid graft copolymer as in claim 5 wherein the halogenated precursor is chlorinated polybutadiene.

10. A solid graft copolymer as in claim 5 wherein the halogenated precursor is chlorinated styrene-butadiene elastomer.

11. A solid graft copolymer as in claim 4 wherein the halogenated precursor is bromobutyl rubber.

12. A solid graft copolymer as in claim 4 wherein the halogenated precursor is chlorobutyl rubber.

13. A blended polymeric molding composition comprising:
   (1) from about 5 to about 50 weight percent of a rubbery elastomer,
   (2) from about 50 to about 95 weight percent of an oxymethylene polymer, and
   (3) from about 2 to about 15 weight percent of a solid graft copolymer prepared by grafting from about 20 to about 80 weight percent, based on the total weight of the graft copolymer, of oxymethylene polymer chains which are formaldehyde chains having the structure $$-CH_2O)_{n1}CH_2OH$$

or oxymethylene copolymer chains having the structure:

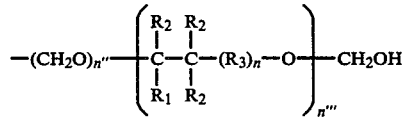

wherein $R_1$ and $R_2$ are hydrogen or a lower alkyl group, $R_3$ is a methylene group, an oxymethylene group, a lower alkyl-substituted methylene group or a lower alkyl-substituted oxymethylene group, n is an integer from zero to three, inclusive, $n^1$ is an integer of from about 25 to about 5000, and $n^{11}$ and $n^{111}$ are integers the sum of which is from about 25 to about 5000, with from about 85 to about 99.9 percent of the integers represented by $n^{11}$ plus $n^{111}$ being oxymethylene groups, onto initiated sites on an elastomeric polymer backbone, the initiated sites having been introduced into the backbone by the reaction of a cationic salt with a halogenated precursor of the elastomeric polymer, the weight percentages of components (1), (2) and (3) totaling 100% and being based on the total weight of these polymeric components present in the composition.

14. A blended polymeric molding composition as in claim 13 wherein:
   (1) the rubbery elastomer is present in an amount of from about 20 to about 30 weight percent,
   (2) the oxymethylene polymer is present in an amount of from about 70 to about 80 weight percent, and
   (3) the solid graft copolymer is present in an amount of from about 5 to about 10 weight percent and contains polyformaldehyde chains present in an amount of from about 30 to about 60 weight percent, based on the total weight of the graft copolymer.

15. A blended polymeric molding composition as in claim 14 wherein:
   (1) the rubbery elastomer is poly (1,3-butadiene), polyisoprene or a styrene-butadiene elastomer,
   (2) the oxymethylene polymer is an oxymethylene copolymer, and
   (3) the solid graft copolymer is prepared by grafting polyformaldehyde chains onto initiator sites on an elastomeric polymer backbone to give a graft copolymer wherein polyformaldehyde chains are present in an amount of from about 30 to about 60 weight percent, based on the total weight of the graft copolymer, and n' is an integer of from about 2000 to about 4000.

16. A blended polymeric molding composition as in claim 15 wherein the halogenated precursor of the elastomeric polymer is bromobutyl rubber.

17. A blended polymeric molding composition as in claim 15 wherein the halogenated precursor of the elastomeric polymer is chlorobutyl rubber.

18. A blended polymeric molding composition as in claim 15 wherein the halogenated precursor of the elastomeric polymer is polychloroprene.

19. A blended polymeric molding composition as in claim 15 wherein the halogenated precursor of the elastomeric polymer is chlorinated polybutadiene.

20. A blended polymeric molding composition as in claim 15 wherein the halogenated precursor of the elastomeric polymer is chlorinated styrene-butadiene elastomer.

* * * * *